Oct. 19, 1965 N. SHORR ETAL 3,212,872
GLASS SHEET DRAWING APPARATUS WITH AN ENERGY TRANSMITTER
Filed May 11, 1961 4 Sheets-Sheet 3

INVENTORS
NORMAN SHORR and
JOSEPH M. BURSICH
BY
Oscar L. Spencer
ATTORNEY

Oct. 19, 1965  N. SHORR ETAL  3,212,872
GLASS SHEET DRAWING APPARATUS WITH AN ENERGY TRANSMITTER
Filed May 11, 1961  4 Sheets-Sheet 4

INVENTORS
NORMAN SHORR and
JOSEPH M. BURSICH
BY

ATTORNEY

United States Patent Office 3,212,872
Patented Oct. 19, 1965

3,212,872
GLASS SHEET DRAWING APPARATUS WITH
AN ENERGY TRANSMITTER
Norman Shorr, Mount Lebanon, and Joseph M. Bursich, Allison Park, Pa., assignors to Pittsburgh Plate Glass Company, Pittsburgh, Pa., a corporation of Pennsylvania
Filed May 11, 1961, Ser. No. 112,156
2 Claims. (Cl. 65—203)

This application is a continuation-in-part of our copending application, Serial No. 93,459, filed March 6, 1961, entitled Manufacture of Glass.

This invention relates to the manufacture of sheet glass by continuous drawing from a bath of molten glass and more particularly relates to improved methods and apparatus for increasing the speed at which the glass is drawn while producing sheet glass of improved appearance wherein the usual characteristic wave pattern, i.e., transverse thickness variations which appear as bands of ribs extending generally in the direction of the draw, is eliminated or materially reduced.

In conventional processes of drawing sheet glass, a natural stack is induced by the geometry of the sheet, bath and drawing chamber wherein there is a transfer of heat from the bath and sheet at relatively elevated temperatures to the cooler ambient air within the chamber producing a convection flow of air in the direction of the draw and out of the chamber. The movement of the heated air in the direction of the draw results in zones of reduced pressure at the base or meniscus of the sheet, so that colder air is drawn to the reduced pressure zones. Air enters the drawing chamber at the juncture of the chamber and the drawing machine and leaks into the chamber from cracks, crevices, or the like in the chamber walls. Colder air flowing to the zones of low pressure is chilled by moving generally across coolers, which are disposed within the chamber slightly above the surface of the bath and on the opposite sides of the sheet to accelerate the setting of the glass. As readily understood, the temperature of entering air will be nonuniform because of differences in temperature of the sources of this air, and this condition will persist due to differences in paths taken by this air in the drawing chamber and, also, due to conditions within the kiln. These temperature differences cause nonuniform velocities within the drawing chamber. The colder air of nonuniform velocities flows to the reduced pressure zones and disturbs the relatively thin surface adhering film moving with the glass causing nonuniform heat transfer across the sheet, thereby affecting the formation of the glass in the area where the glass undergoes the transition from fluid to solid state. Being in the plastic state and under stress, the glass is unequally attenuated to form a characteristic longitudinal wave pattern.

Wave pattern in drawn glass may be substantially eliminated through structural modifications within the drawing chamber, as by utilizing an insulating material on the back surface of each cooler in the manner disclosed in the application for United States Letters Patent of Cecil R. Ward, Serial No. 59,743, filed September 30, 1960, entitled Manufacture of Glass. An insulating material, such as that contemplated in the above-mentioned application, prevents the air behind each cooler from being cooled and flowing down toward the molten bath. In addition, the insulating material absorbs heat radiated from the molten bath, becomes heated above the ambient temperature within the kiln, and in turn heats the adjacent air so as to create a stack of rising air currents behind the cooling members. This stack effect is counter to the normal flow of air currents toward the area where the glass undergoes the transition from fluid to solid state and thereby prevents the colder air of nonuniform velocities from affecting the formation of the glass sheet and thereby substantially eliminates the characteristic wave pattern normally associated with drawn glass. The use of such an insulation, however, imposes a speed penalty upon the drawing process. That is, it reduces the rate at which the glass sheet can be drawn from the molten bath. This is because the speed at which a given sheet thickness of glass may be drawn is dependent upon the rate at which the glass sheet solidifies or sets. This in turn varies with the temperature within the drawing chamber. Heretofore, the use of an insulating material to control the air currents within a drawing chamber has resulted in a substantial increase in the ambient temperature by preventing the insulated surface of the cooling member from absorbing heat. The resultant decrease in drawing speed has, of course, been disadvantageous from a production standpoint.

Briefly, the invention herein disclosed utilizes novel means for insulating a portion of each cooling member so as to control the air currents within the drawing chamber by creating a stack of rising air and by insulating a surface of the cooling member from the surrounding air, while at the same time permitting the cooling member to absorb radiant heat from the molten bath so as to reduce the ambient temperature within the drawing chamber and increase the speed at which the glass sheet may be drawn. Each of the cooling members is disposed adjacent glass which is in the plastic state where contact with the glass would mar its surface.

A primary object of the present invention is therefore the provision of improved methods and apparatus for improving the wave pattern characteristically found in drawn sheet glass without the resultant reduction in drawing speed normally associated with relatively pattern-free drawn sheet glass. More specifically, it is an object of this invention to provide methods and apparatus for controlling the undesirable air currents within the drawing chamber without an accompanying substantial increase in the ambient temperature.

Other objects and features of this invention will be apparent from the following description and the appended drawings which illustrate this invention and in which.

Figure 1:
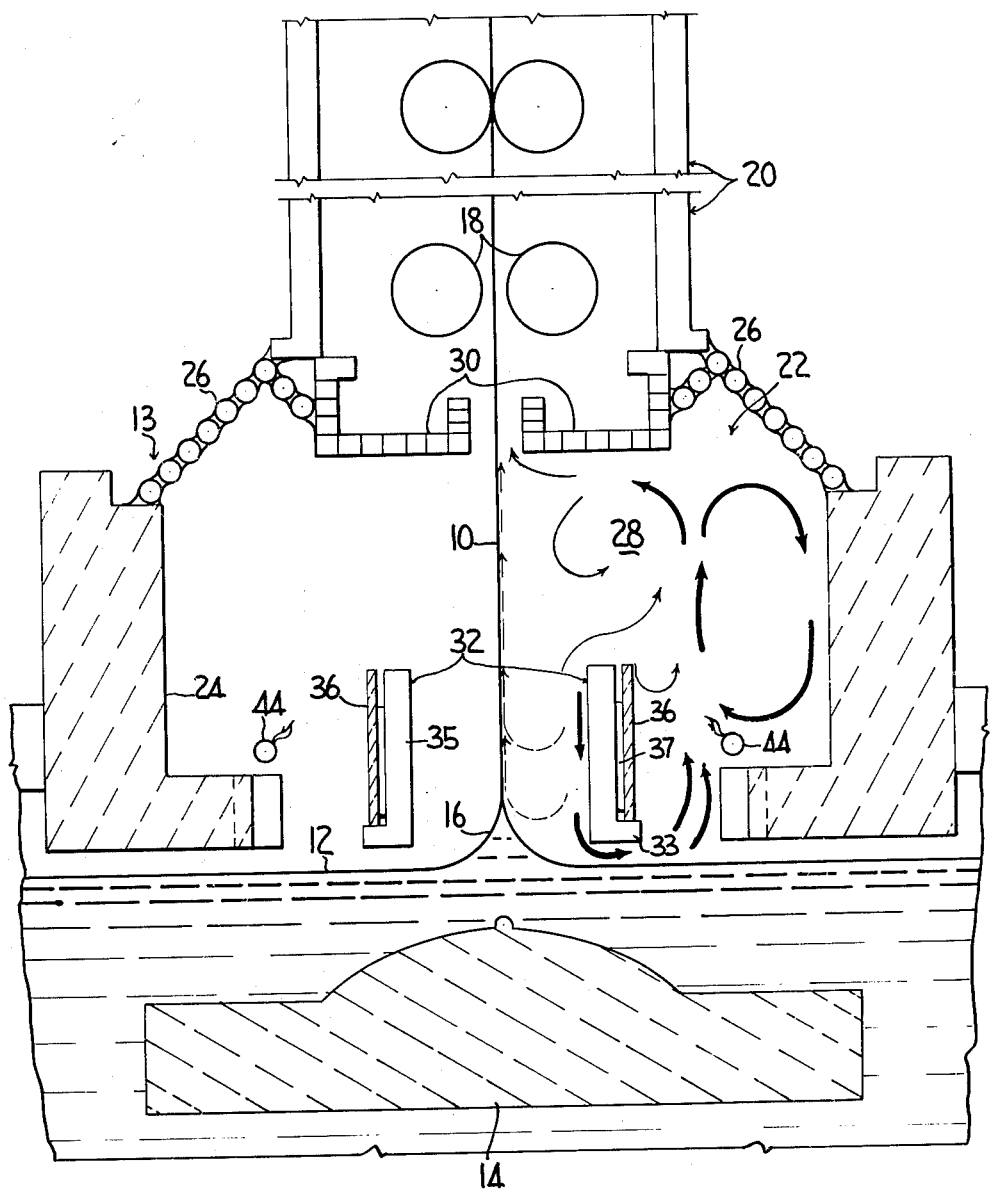
FIG. 1 shows diagrammatically a drawing kiln modified in accordance with the present invention to eliminate the air currents which normally produce the characteristic wave pattern in drawn sheet glass.
Figure 2:
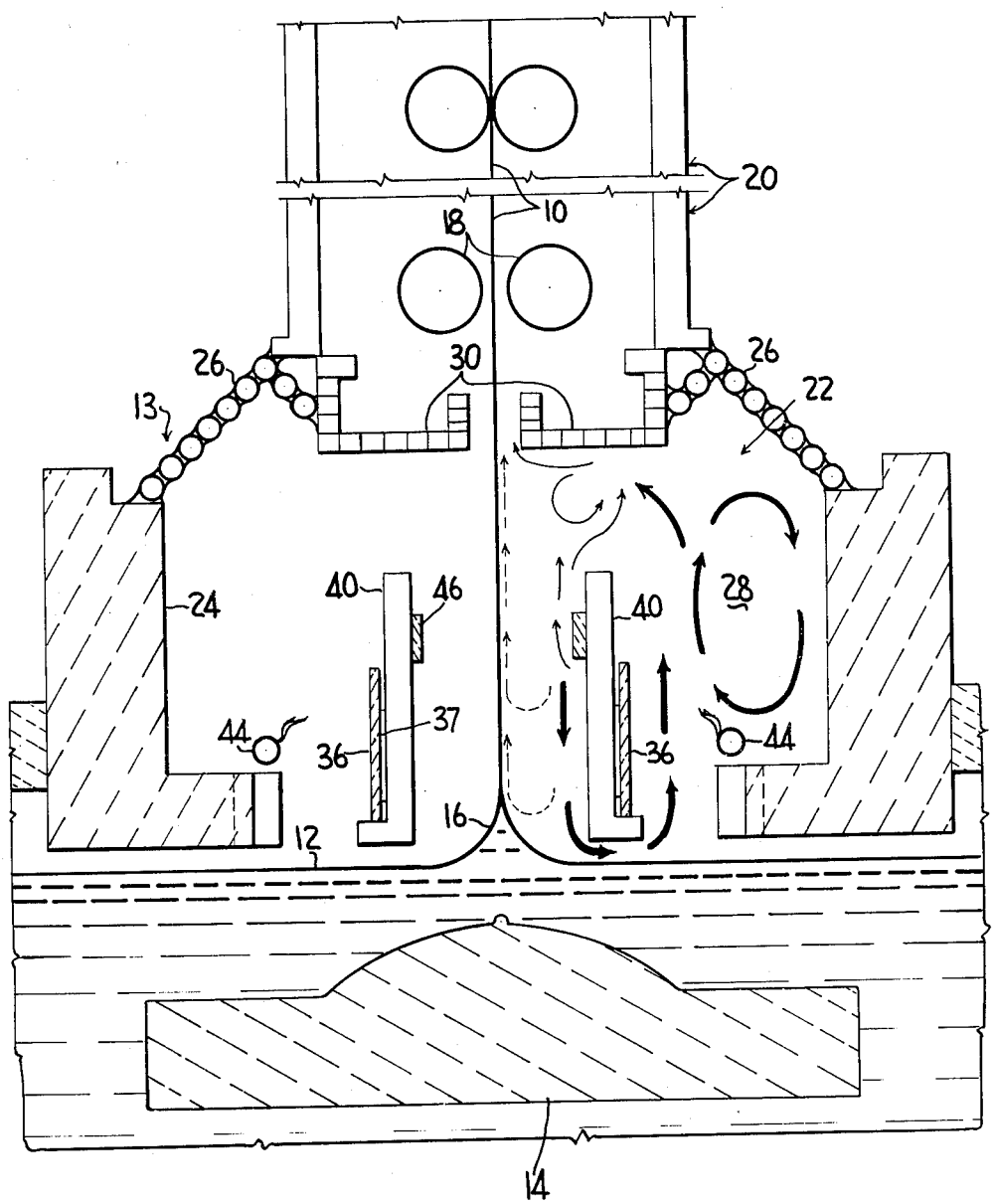
FIGS. 2 and 3 show, diagrammatically, modifications of the cooling members wherein an insulating material is mounted on the front and back surfaces thereof.
Figure 3:
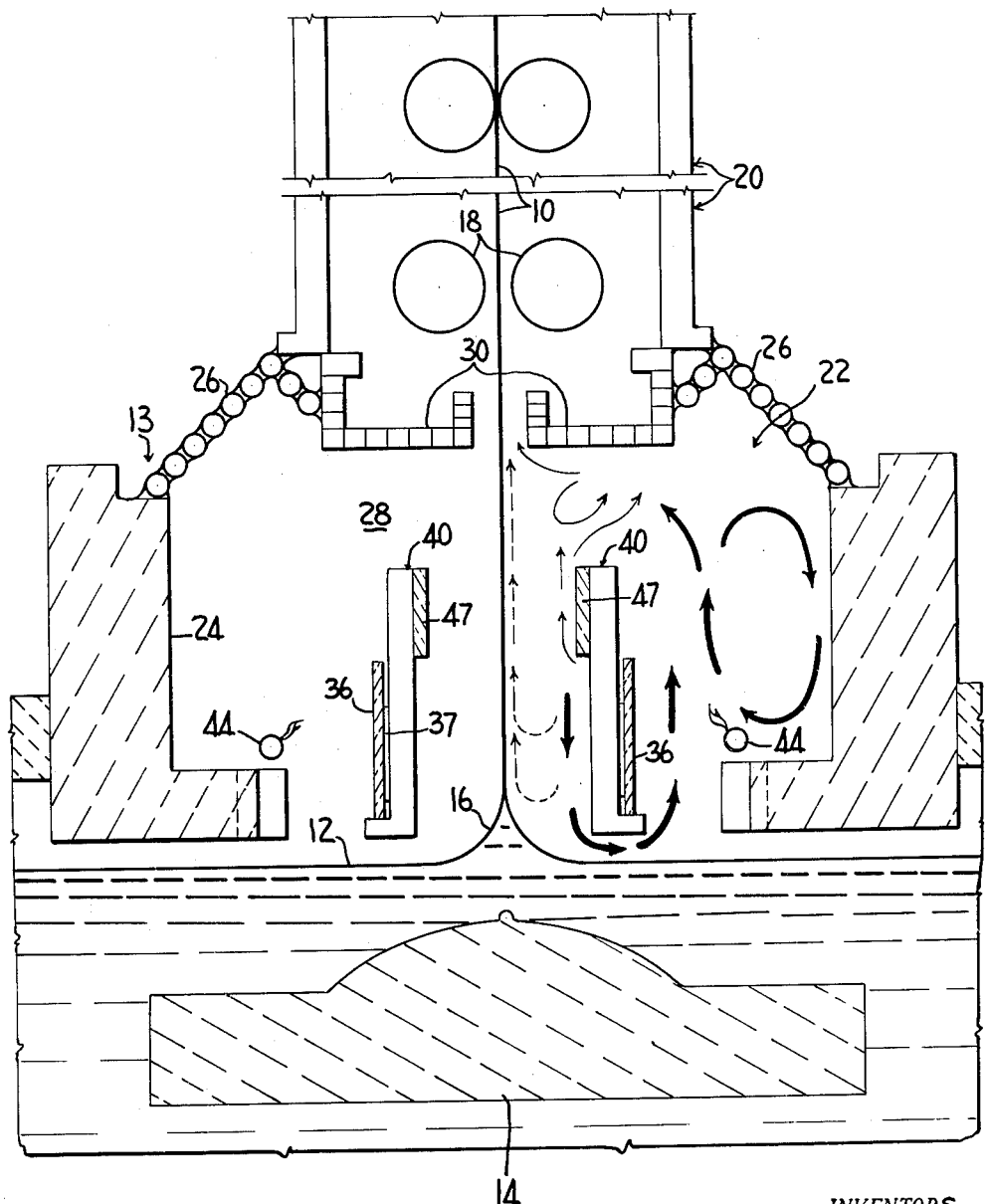

Turning to the drawings wherein like parts are identified with like reference characters, there is shown in each of FIGS. 1–3 a sheet of glass 10 being drawn from a bath 12 of molten glass in a drawing kiln generally indicated at 13 (only parts of which are shown but which is a conventional construction). A draw bar 14 extending transversely of the kiln 13 is submerged in bath 12. The glass sheet 10 in its viscous condition forms a base or meniscus 16 with the surface of the bath 12, and the sheet 10 is drawn from the bath 12 and through the drawing chamber 22 of a kiln 13 by means of drawing rolls 18 of a conventional drawing machine generally indicated at 20. The drawing chamber 22, as depicted in the drawings, is defined by bath 12 and conventional L-blocks 24, ventilator water coolers 26, end walls 28 and catch pans 30. The ventilator coolers 26 are each positioned between an L-block 24 and the base framework of the drawing machine 20 and extend substantially to the end walls 28 of the kiln 13. The base of the drawing machine 20 is substantially closed by means of the generally U-shaped catch pans 30, which are formed as coolers and are positioned so as to catch broken glass which may drop in the machine and thus prevent entry of fragments into the bath 12. These catch pans 30 also extend substantially to the end walls 28 of the kiln 13 and are constructed for the passage of cooling fluid, such as water. One leg of each catch pan 30 is disposed substantially parallel to and spaced from the sheet 10. Conventional water coolers 32 are provided for cooling sheet 10 by absorbing radiation from the sheet 10. The coolers 32 are spaced above the surface of the bath 12 and are positioned on opposite sides of the sheet 10 to extend substantially the width of the sheet.

So much of the apparatus as has been just described is common to the prior art and the instant invention, and constitutes a normal or usual sheet glass drawing apparatus setup.

Reference is now made to FIG. 1 illustrating a preferred embodiment of this invention wherein, in addition to the conventional apparatus elements in their usual structural arrangement, there are gas current injecting means, such as burners 44, extending substantially the width of the plane of draw of the glass sheet and positioned adjacent the front portion of the foot of each L-block. There is also a backing, such as sheet material 36, fastened to the back surface of each cooling member 32. Sheet 36 rests on a foot portion 33 of each cooling member and is spaced from the upright portion 35 by suitable spacing means, such as metal strips 37 better shown in FIG. 4. The sheet of material 36 is formed of a fused silica, or other refractory material capable of withstanding high operating temperatures, on the order of 1500° F. encountered in the drawing chamber. The sheet of material 36 is transparent to infrared radiant energy, yet substantially impervious to air, so as to insulate the cooling member from the ambient air.

By way of example, sheet materials that will function in accordance with this invention include sheets of fused silica or 96 percent silica glass. Fused silica has the composition $SiO_2$ in amorphous or noncrystalline condition and may be made by melting crushed silica quartz, or sand, without other constituents. It is characterized by a high softening temperature and a low coefficient of expansion. Ninety-six percent silica glass has the approximate composition of 96.3% $SiO_2$, 2.9% $B_2O_3$, 0.4% $Al_2O_3$ and 0.4% other alkalies and may be made by leaching out soluble constituents of a borosilicate glass with acids, and then fusing at high temperatures the porous skeleton of almost pure silica. A transparent, nonporous, high softening point glass results.

In addition, it has been found that other high softening point glasses with low coefficients of thermal expansion are useful because of their very high transmittance of infrared radiation. An example of a high softening point glass capable of being used as a backing on a cooler is disclosed in the copending application, Serial No. 784,454, filed January 2, 1959, of James E. Duncan et al., now abandoned. The glass therein disclosed and claimed has a strain point of 1150° to 1300° F., a coefficient of thermal expansion of 4.4 to $5.6 \times 10^{-6}$ per ° C. from 0 to 300° C., an annealing point of about 1230–1380° F., and a softening point of about 1500–1700° F. The glass consists essentially of the following ingredients in percent by weight:

| | Percent |
|---|---|
| $SiO_2$ | 43 to 49 |
| CaO | 7 to 12 |
| MgO | 5 to 8 |
| $Al_2O_3$ | 19 to 26 |
| $B_2O_3$ | 4 to 10 |
| BaO | 6 to 12 |
| $Na_2O$ | 0.1 to 2 |

The glass has a high degree of resistance to thermal shock because of its low coefficient of thermal expansion and, in addition, has optical and infrared clarity. For example, sheets of glass made in accordance with the aforesaid United States application of Duncan et al. and ¼ inch to ½ inch thick will transmit approximately 90 percent of the infrared radiant energy reaching their surfaces.

Fused silica, depending upon its thickness and transparency, varies in its ability to transmit infrared radiant energy. It has been found, however, that a ⅜ inch sheet of a standard grade of commercially obtained fused silica, such as that sold under the trade name "Amersil," spaced slightly from the back of each cooling member so as not to be cooled thereby will transmit from 30 to 50 percent of the infrared radiant energy reaching its surface. Thicker sheets of material may be used without spacing them from the cooling members inasmuch as the high thermal gradient of these materials will prevent substantial cooling of the outer surface of a thicker sheet by contact with the cooling members. As the thickness of the sheets is increased, it becomes desirable to use materials which transmit a greater percentage of infrared radiation (such as a clear silica or a high softening point clear glass).

As a practical matter ¼ inch to ½ inch thick sheets of material are preferred for cooler backings. Sheets less than ¼ inch in thickness generally lack the required strength, and sheets more than ½ inch in thickness are generally too heavy for the purpose described. Thickness, color and surface finish affect the transmission of infrared radiant energy; for example, the thicker the sheet, the lower the transmission, clear material has a higher transmission than colored material, and smooth surfaced material has a higher transmission than rough surface material. It is generally preferable to use sheet material for the cooler backings which transmit greater than 25 percent of the infrared radiant energy reaching the surface thereof because materials transmitting lesser percentages of the infrared radiant energy reaching their surfaces do not materially increase the sheet glass drawing speed.

FIGS. 2 and 3 illustrate a second and third embodiment, respectively, of the invention wherein cooling members 40 are utilized having a greater vertical dimension than the normal cooling members. A strip of insulating material of fused silica or other refractory material, which is transparent to radiant energy, capable of withstanding high operating temperatures and substantially impervious to air, extends across a part of the front surface of each cooling member either several inches below the top thereof, as shown in FIG. 2, or completely covering the upper portion of the front surface, as shown in FIG. 3. The insulating material could cover only the front surfaces of the cooler.

Figure 4:
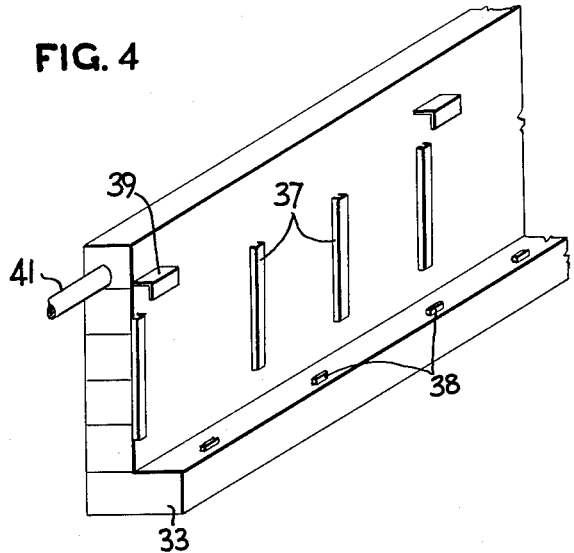
FIG. 4 shows mounting details for securing a sheet backing material on the back of the cooling member.

FIG. 4 illustrates an arrangement for properly positioning and securing the insulating material to the back surface of a cooling member. The upper surface of the backwardly extending foot portion 33 contains upwardly extending tabs 38 to form a channel for locating the bottom portion of the insulating material. Suitably fastened to the top surface of each cooling member 32 are brackets 39 which provide a channel for the top portion of the material. Strips of metal or other suitable material 37 are preferably fastened to the back surface of the upright portion of the cooling member to space the insulating material from the back surface of the cooler. With this arrangement, the insulating material may be slid into place from either end of the cooler and will be secured thereto in spaced relationship so as to provide a dead air space between the cooling member and the material. Pipes 41 provide for continuous circulation of water through the cooling member in a manner well known in the art.

In FIGS. 1 to 3, inclusive, of the drawings, the directions of the principal air currents within the drawing chamber 22 are shown by arrows for the right-hand portion of chamber 22. It is not necessary to show the principal air currents to the left of sheet 10 because they are mirror images of those shown. Relatively high, intermediate, and relatively low velocity air currents are shown in heavy solid, light solid, and broken lines, respectively.

The principal air currents for a normal drawing kiln are shown in FIG. 1 of James and Ward United States Patent No. 3,097,942, issued July 16, 1963, and are fully described therein.

In accordance with the present invention (referring to FIG. 1 of the drawings), the insulating material 36 prevents the back surface of the cooling member from cooling the air behind it, thereby preventing such air from flowing downwardly toward the molten bath. Being substantially transparent to radiant energy, the insulating material disclosed herein permits the back portion of the cooling member to absorb heat radiated from the adjacent L-block and the bath in the area between each L-block and each cooling member. This results in a substantial lowering of the ambient temperature in the drawing chamber as compared with a drawing chamber having an insulated cooler where the insulating material is not transparent to radiation. Furthermore, because the material does not transmit all of the radiant energy reaching its surface, it gradually absorbs heat radiated from the high temperature molten bath and increases in temperature. The insulating backing thereby attains an elevated temperature above the temperature of the surrounding air and substantially equal to the temperature reached by an asbestos or nontransmitting type of insulation. It will maintain this temperature by virtue of the dead air space between the cooling member and the backing or, if in direct contact with the cooling member, by virtue of its thickness and low coefficient of thermal conduction. As the backing material reaches an elevated temperature, it becomes a localized source of heat, and this heat is conducted to the adjacent air. Due to the location and vertically planar configuration of the backing, it is ideally suited to create a strong upwardly directed stack of hot air behind each cooler. This upwardly directed stack, by itself or in conjunction with a similar rising current of gas created by the gas current injecting means 44, counteracts the normally cyclical movement of air in the area between the coolers and their respective L-blocks, which air normally flows toward the base 16 of the glass sheet being formed. In addition, the low pressure area caused by the stack at the base of each cooling member causes air which may normally cascade downwardly across the front surface (facing the plane of draw) of each cooling member to the base 16, to be drawn underneath and behind the coolers away from the base or meniscus of the continous sheet being formed and into the stack of rising air created by the backing on each cooler. Because this materially reduces the flow of air toward the base 16, the effects of the non-uniformity in velocities and temperatures of this air are diminished. It can be seen therefore that even though the backing herein disclosed transmits a large portion of the radiant energy reaching its surface and thereby permits the cooling members to lower the ambient temperature within the drawing chamber, it still retains the ability to control in a desirable manner the air currents within the drawing chamber. In this manner the subject invention makes possible the production of substantially pattern-free drawn glass while utilizing high drawing speeds of a magnitude previously associated only with arrangements in which air currents within the drawing chamber were not controlled.

Looking now to FIGS. 2 and 3, there is shown in each Figure a cooler having a larger vertical dimension than the normal cooler used in this type of operation. A backing of fused silica or other similarly suitable material partially or wholly covers the back surface of the cooler, and a strip of fused silica or similar material is secured to the front surface of the cooling member; either intermediate the top and bottom portion thereof as in FIG. 2, or covering the top portion thereof as shown in FIG. 3. The sheet of insulating material on the back surface of the cooling members functions in the same manner as described in connection with FIG. 1; i.e., it allows the cooler to absorb radiant energy from the molten bath and from the area between each cooling member and each L-block while at the same time creating a rising stack of warm air behind each cooling member which draws colder air, that would normally cascade down the front surface of the cooler toward the base portion of the sheet, underneath the cooler and away from the base portion into the rising stack of air. The strength of the stack produced behind each cooling member is, of course, capable of influencing the air only to a limited height in front of the cooling member. This fact has in the past limited the height of the cooling members because any exposed cooling surface near the glass sheet would cool the adjacent air and, if that air was not drawn down, underneath and behind the cooling members (as by the low pressure area created by a stack of rising air currents behind the cooling members), it would flow against the glass sheet and create an undesirable pattern in the glass. Therefore, the cooling members could be no higher than the height to which the stack behind each cooling member was capable of affecting the air in front of the cooling member. However, it is desirable, from a production standpoint, to increase the height of the cooling members because the glass sheet must be exposed to the cooling members for a sufficient time to become set or solidified before it leaves the drawing chamber and reaches the drawing rolls. With higher coolers, the glass may be drawn at a more rapid rate while being exposed to the cooling members for the same length of time as previously.

In accordance with the instant invention, the cooling members may be increased in height without producing an adverse effect upon the glass sheet being drawn. This is accomplished by securing a strip of fused silica to the front face of each cooling member at that point which is the upper limit of the effectiveness of the stack produced behind the cooling member. This strip may cover the entire upper portion of the cooling member or may terminate short of the top of the cooling member. While heretofore it was impossible to cool the glass sheet above a certain point due to the adverse effect on the air currents by any cooling member so located, it is now possible to extend the cooling member substantially higher. The strip of fused silica or similarly suitable material on the front surface allows the cooling member directly behind it to cool the sheet by absorbing radiant energy. At the same time, the insulating characteristic of the material prevents the surrounding air from being cooled and adversely affecting the drawn sheet. Where a strip of material is placed intermediate the top and bottom of the cooling member it will, as it becomes heated above ambient temperature and in turn heats the adjacent air, create a small upwardly directed stack of rising hot air along the front surface of the cooling member directly above the strip. Thus, any air which would normally be cooled by the upper front portion of the cooling member that is not insulated and which would normally then flow toward the sheet of glass being drawn, will now be directed upwardly and away from the sheet by this rising stack of warm air on the upper front surface of the cooling member, and will produce no undesirable pattern in the glass sheet. At the same time, the additional cooling surface behind and above the strip of fused silica or similarly suitable material will permit the glass sheet to be drawn at a substantially increased rate.

The improvement in speed with the retention of quality heretofore possible only with lower drawing speeds may be readily appreciated when it is noted that with normally insulated coolers and L-burners the increased temperature within the drawing chamber results in a 10–12 percent loss in drawing speed over a standard arrangement utilizing no insulating materials or burners but producing a glass having substantially more pattern. By insulating the back surface of the same cooling members with fused silica in the manner described in connection with FIG. 1 of this invention, the loss in drawing speed over the standard arrangement mentioned has been reduced to a level of 4 to 5 percent with substantially no decrease in the quality of the glass as compared with that produced with the asbestos-type insulation at a 10 to 12 percent loss in drawing speed.

The insulating material herein described can be raised or lowered or otherwise moved during the operation of the drawing apparatus, so that all or only a portion of the cooler is insulated at any one time. Also, the insulating material can be contoured, as for example, have portions thicker than other portions, along its height or width.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

We claim:

1. In apparatus for drawing sheet glass from a bath of molten glass through a drawing chamber, the improvement which comprises cooling members located within said drawing chamber and adjacent each face of the sheet of glass drawn therethrough, each cooling member having spaced broad surfaces opposite and coextensive with the adjacent surface of said drawn glass sheet and being so constructed and arranged to absorb heat from said drawing chamber in a region overlying and substantially coextensive of the width of one of said broad surfaces and a sheet-like member transparent to at least 25 percent of the radiant energy reaching its surface and absorbent to a portion of the radiant energy reaching its surface, said sheet-like member being supported by and closely adjacent each of said cooling members for transmitting a percentage of the radiant energy to said coolers in said drawing chamber.

2. Apparatus as in claim 1 wherein said member transmits 25 to 90 percent of said radiant energy absorbed thereby.

References Cited by the Examiner

UNITED STATES PATENTS

| | | | |
|---|---|---|---|
| 1,656,103 | 1/28 | Drake | 65—204 |
| 1,830,788 | 11/31 | Forman | 65—85 |
| 1,836,409 | 12/31 | Trinks et al. | 65—204 X |
| 1,836,410 | 12/31 | Trinks et al. | 65—203 |
| 1,836,411 | 12/31 | Trinks et al. | 65—204 X |
| 2,284,348 | 5/42 | Tharp | 65—204 X |
| 2,693,052 | 11/54 | Brichard | 65—204 X |
| 2,864,203 | 12/58 | Long | 65—348 |
| 2,963,820 | 12/60 | Brichard | 65—204 X |
| 2,991,590 | 7/61 | Brichard | 65—204 |

FOREIGN PATENTS 724,326   2/55   Great Britain.

DONALL H. SYLVESTER, *Primary Examiner.*

IVAN R. LADY, *Examiner.*